United States Patent
Yang

(10) Patent No.: US 12,167,433 B2
(45) Date of Patent: Dec. 10, 2024

(54) METHODS AND APPARATUSES FOR CONFIGURING SIDELINK RESOURCE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 521 days.

(21) Appl. No.: 17/418,761

(22) PCT Filed: Dec. 25, 2018

(86) PCT No.: PCT/CN2018/123499
§ 371 (c)(1),
(2) Date: Jun. 25, 2021

(87) PCT Pub. No.: WO2020/132868
PCT Pub. Date: Jul. 2, 2020

(65) Prior Publication Data
US 2022/0070874 A1  Mar. 3, 2022

(51) Int. Cl.
*H04W 72/541* (2023.01)
*H04W 48/10* (2009.01)
(Continued)

(52) U.S. Cl.
CPC .......... *H04W 72/541* (2023.01); *H04W 48/10* (2013.01); *H04W 72/02* (2013.01); *H04W 72/20* (2023.01); *H04W 72/542* (2023.01)

(58) Field of Classification Search
CPC ....... H04W 92/18; H04W 76/14; H04W 4/40; H04W 4/46; H04W 28/0268; H04W 4/44; H04J 11/005
See application file for complete search history.

(56) References Cited

U.S. PATENT DOCUMENTS

| 2013/0223398 A1 | 8/2013 | Li et al. |
| 2016/0044619 A1 | 2/2016 | Ryu et al. |

(Continued)

FOREIGN PATENT DOCUMENTS

| CN | 104144426 A | 11/2014 |
| CN | 104995976 A | 10/2015 |

(Continued)

OTHER PUBLICATIONS

International Search Report of International Application No. PCT/CN2018/123499 dated Sep. 27, 2019 with English translation, (2p).
The First CNOA and Search Report Issued in Application No. 201880003386.8, dated Sep. 14, 2022, with Machine English Translation, (15p).
INOA Issued in Application No. 202147030553, dated Mar. 9, 2022, with English Translation, (5p).
Samsung, "Resource Configuration & Selection for D2D Direct Discovery", R2-132526, 3GPP TSG RAN WG2 Meeting #83 Barcelona, Spain Aug. 19-23, 2013, 4 pages.

(Continued)

*Primary Examiner* — Khalid W Shaheed
(74) *Attorney, Agent, or Firm* — Arch & Lake LLP

(57) ABSTRACT

Methods and apparatuses for configuring sidelink resource are provided. A method includes that a first sidelink terminal: generates resource sensing indication information; transmits the resource sensing indication information to a second sidelink terminal, where the resource sensing indication information instructs the second sidelink terminal to perform resource sensing according to the resource sensing indication information and return an obtained resource sensing result to the first sidelink terminal; receives the resource sensing result returned by the second sidelink terminal; and selects a sidelink resource for sidelink communication according to the resource sensing result.

11 Claims, 8 Drawing Sheets

(51) Int. Cl.
  *H04W 72/02* (2009.01)
  *H04W 72/20* (2023.01)
  *H04W 72/542* (2023.01)

(56) References Cited

U.S. PATENT DOCUMENTS

| | | | |
|---|---|---|---|
| 2016/0345313 A1 | 11/2016 | Zhao et al. | |
| 2017/0171837 A1 | 6/2017 | Chen et al. | |
| 2017/0188391 A1 | 6/2017 | Rajagopal et al. | |
| 2017/0215098 A1 | 7/2017 | Huang et al. | |
| 2017/0303240 A1 | 10/2017 | Basu Mallick et al. | |
| 2017/0339579 A1 | 11/2017 | Chu et al. | |
| 2020/0163005 A1* | 5/2020 | Rao | H04W 4/46 |

FOREIGN PATENT DOCUMENTS

| | | | | |
|---|---|---|---|---|
| CN | 106686736 A | | 5/2017 | |
| CN | 107736064 A | | 2/2018 | |
| CN | 108024264 A | * | 5/2018 | H04W 24/02 |
| CN | 108028730 A | | 5/2018 | |
| CN | 108353403 A | | 7/2018 | |
| CN | 108616839 A | * | 10/2018 | H04L 5/0037 |
| CN | 108632779 A | | 10/2018 | |
| CN | 108781436 A | | 11/2018 | |
| CN | 109076561 A | | 12/2018 | |
| WO | 2017133290 A1 | | 8/2017 | |
| WO | 2018080381 A1 | | 5/2018 | |
| WO | 2018175553 A1 | | 9/2018 | |

OTHER PUBLICATIONS

CATT, "Correction for Resource Relection of Mode-4 in TS 36.321", R2-1701253, 3GPP TSG-RAN WG2 Meeting #97 Athens, Greece, Feb. 13-17, 2017, 7 pages.

Intel Corporation, "Summary for NR-V2X AI—7.2.4.1.4 Resource Allocation Mechanism", R1-1814260, 3GPP TSG RAN WG1 Meeting #95 Spokane, USA, Nov. 12-16, 2018, 14 pages.

International Preliminary Report on Patentability and Written Opinion of International Application No. PCT/CN2018/123499 dated Jun. 16, 2021 with English translation, (9p).

Extended European Search Report issued in EP Application No. 18944444.1 dated Dec. 3, 2021, (8p).

State Intellectual Property Office of the People's Republic of China, Office Action and Search Report Issued in Application No. 2018800033868, dated Apr. 28, 2023, Submitted with Machine Translation, (14p).

European Patent Office, Office Action Issued in Application No. 18944444.1, dated Feb. 3, 2023, Germany, (5p).

Institute for Information Industry (III), "Resource allocation scheme for in-coverage D2D communication to support Mode 1 and Mode 2", 3GPP TSG RAN WG1 Meeting #77, R1-142293, Seoul, Korea, May 19-May 23, 2014, (6p).

Samsung Electronics Co., Ltd., "CR 26.346-0346 Keep Updated Service (Release 12)", 3GPP TSG-SA4 Meeting #76, S4-131211, Osaka, Japan, Nov. 4-8, 2013, (7p).

EP Office Action of European Patent Application No. 18944444.1 dated Aug. 23, 2024, (7p).

* cited by examiner

METHODS AND APPARATUSES FOR CONFIGURING SIDELINK RESOURCE

CROSS REFERENCE TO RELATED APPLICATIONS

This application is the national phase application of International Application No. PCT/CN2018/123499, filed on Dec. 25, 2018, the entire content of which is incorporated herein by reference for all purposes.

TECHNICAL FIELD

The present disclosure relates to the field of communication technology, and in particular to methods and apparatuses for configuring sidelink resource.

BACKGROUND

With continuous development of communication technology, and in order to support direct communication between a terminal (or User Equipment, UE for short) and another terminal, a side link (also named as sidelink) communication method is introduced. In related art, terminals can autonomously select sidelink resources from a resource pool for sidelink communication, that is, the terminals randomly select transmission resources from a resource pool broadcast by a network or a pre-configured resource pool. However, the autonomous selection may lead to a coincidence of transmission resources selected by different terminals, thereby causing interference to other terminals.

SUMMARY

In order to overcome the problems in the related art, the embodiments of the present disclosure provide methods and apparatuses for configuring sidelink resource.

According to a first aspect of the present disclosure, a method of configuring sidelink resource is provided. The method includes that a first sidelink terminal generates resource sensing indication information and transmits the resource sensing indication information to a second sidelink terminal, where the resource sensing indication information instructs the second sidelink terminal to perform resource sensing according to the resource sensing indication information and return an obtained resource sensing result to the first sidelink terminal.

Further, the method includes that the first sidelink terminal receives the resource sensing result returned by the second sidelink terminal and selects a sidelink resource for sidelink communication according to the resource sensing result.

According to a second aspect of the present disclosure, a method of configuring sidelink resource is provided. The method includes that a second sidelink terminal receives resource sensing indication information transmitted by a first sidelink terminal and obtains a resource sensing result by performing resource sensing according to the resource sensing indication information.

Further, the method includes that the second sidelink terminal returns the resource sensing result to the first sidelink terminal, so that the first sidelink terminal selects a sidelink resource for sidelink communication according to the resource sensing result.

According to a third aspect of the present disclosure, a non-transitory computer readable storage medium storing computer programs is provided. The computer programs are used to perform the method of configuring sidelink resource according to the above first aspect.

According to a fourth aspect of the present disclosure, a non-transitory computer readable storage medium storing computer programs is provided, where the computer programs are used to perform the method of configuring sidelink resource according to the above second aspect.

According to a fifth aspect of the present disclosure, an apparatus for configuring sidelink resource is provided. The apparatus includes a processor and a memory storing instructions executable by the processor.

Further, the processor is configured to generate resource sensing indication information and transmit the resource sensing indication information to a second sidelink terminal, where the resource sensing indication information instructs the second sidelink terminal to perform resource sensing according to the resource sensing indication information and return an obtained resource sensing result to the first sidelink terminal.

Moreover, the processor is configured to receive the resource sensing result returned by the second sidelink terminal and select a sidelink resource for sidelink communication according to the resource sensing result.

According to a sixth aspect of the present disclosure, an apparatus for configuring sidelink resource is provided. The apparatus includes a processor and a memory storing instructions executable by the processor.

Further, the processor is configured to receive resource sensing indication information transmitted by a first sidelink terminal, obtain a resource sensing result by performing resource sensing according to the resource sensing indication information, and return the resource sensing result to the first sidelink terminal, so that the first sidelink terminal selects a sidelink resource for sidelink communication according to the resource sensing result.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
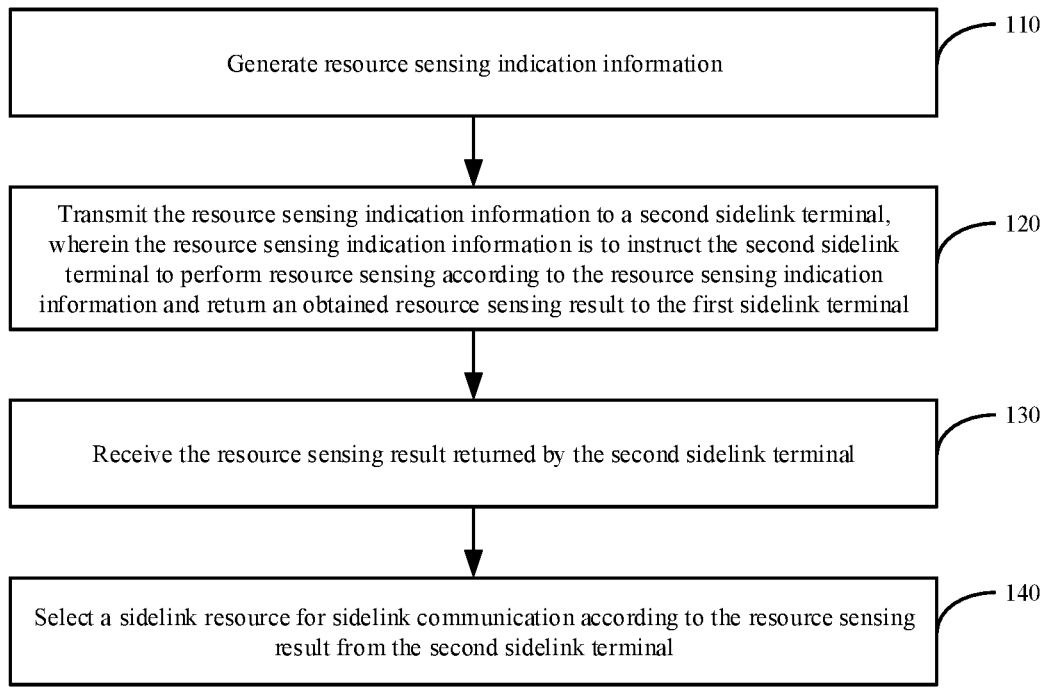
FIG. 1 is a flowchart illustrating a method of configuring sidelink resource according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are only for the purpose of describing specific examples and are not intended to limit the present disclosure. The singular forms "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", etc. may be used in this disclosure to describe various information, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used herein may be interpreted as "on the condition that" or "when" or "in response to determining".

Figure 2:
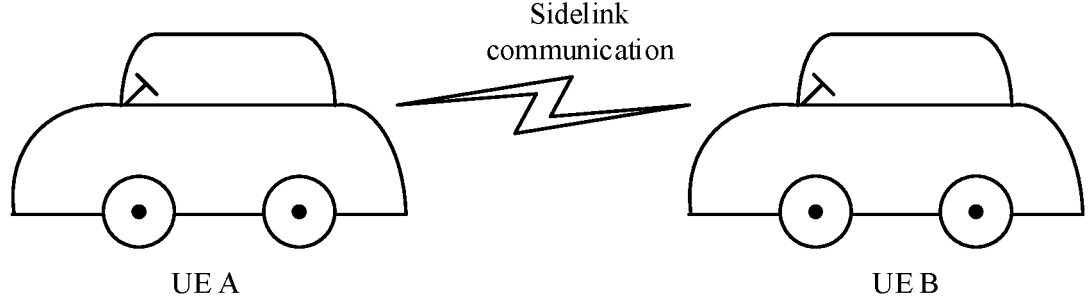
FIG. 2 illustrates an application scenario of a method of configuring sidelink resource according to an example.

FIG. 1 is a flowchart illustrating a method of configuring sidelink resource according to an example; and FIG. 2 illustrates an application scenario of a method of configuring sidelink resource according to an example; the method of configuring sidelink resource may be applied to a first sidelink terminal. As shown in FIG. 1, the method of configuring sidelink resource may include following steps 110 to 140.

At step 110, resource sensing indication information is generated.

In an example of the present disclosure, terminals involved in sidelink communication may include a first sidelink terminal and a second sidelink terminal. The first sidelink terminal may represent a transmission end of sidelink communication, and the second sidelink terminal may represent a receiving end of sidelink communication.

In related art, for a first sidelink terminal autonomously selecting a transmission resource for sidelink communication, a resource sensing mechanism can be introduced. That is, the first sidelink terminal can predict, according to previous sensing of energy transmission in the sidelink communication, whether a certain resource block may be occupied in the future, and then select an unoccupied resource to reduce probability of coincidence.

However, as the transmission resource selected by the first sidelink terminal according to its own resource sensing result may be different from a resource sensing result of the second sidelink terminal, that is, the transmission resource selected by the first sidelink terminal is already occupied by other nearby terminals at the second sidelink terminal, this may cause the second sidelink terminal to be interfered by other nearby terminals. Therefore, in the present disclosure, when the first sidelink terminal configures a sidelink resource, it also takes the resource sensing result from the second sidelink terminal as a reference. For example, the first sidelink terminal may, by using resource sensing indication information, instruct the second sidelink terminal to perform resource sensing and return the resource sensing result to the first sidelink terminal, and the first sidelink terminal can select the sidelink resource for sidelink communication according to the resource sensing result from the second sidelink terminal.

The resource sensing indication information may instruct a second sidelink terminal to perform resource sensing and return an obtained resource sensing result to the first sidelink terminal. However, for the mode in which the second sidelink terminal performs resource sensing, it can be determined by the second sidelink terminal according to actual situation.

For example, if a first sidelink terminal specifies a specific resource sensing mode, a second sidelink terminal may perform resource sensing according to the resource sensing mode specified by the first sidelink terminal.

For another example, a second sidelink terminal may perform resource sensing according to a resource sensing mode specified in a communication protocol.

For another example, a second sidelink terminal may perform resource sensing according to a resource sensing mode pre-agreed by a first sidelink terminal and the second sidelink terminal.

For another example, a second sidelink terminal can autonomously determine a specific resource sensing mode, and transmit the autonomously determined resource sensing mode along with a resource sensing result to a first sidelink terminal, so to facilitate the first sidelink terminal to learn the resource sensing mode used by the second sidelink terminal for obtaining the resource sensing result in time.

In an example, the first sidelink terminal specifies a specific resource sensing mode, and the resource sensing indication information in step 110 may include, but is not limited to, at least one of the following:

(1-1) a specified first period that represents a reporting period specified for the second sidelink terminal periodically reporting the resource sensing result to the first sidelink terminal;

(1-2) a specified Quality of Service (QoS for short) indicator that indicates a QoS basis specified for the second sidelink terminal performing resource sensing;

(1-3) a specified sensing resource range; and (1-4) a specified cell indicator list that includes one or more cell indicators indicating one or more specified cells for which the second sidelink terminal is to perform resource sensing.

The first period in above item (1-1) may be a time value. For example, the first period is 1000 milliseconds.

The QoS indicator in above item (1-2) can be a numerical value, and each numerical value represents a corresponding QoS requirement, including delay, rate, reliability, and so on. The QoS indicator may be 5th Generation QoS Indicator (5QI for short), or PPPP. For example, the 5QI may be indicated by a value 3.

The specified sensing resource range in above item (1-3) may include a specified resource indicator indicating a transmission resource pool and/or a receiving resource pool carried in a cell broadcast; and/or a specified resource pool configuration.

The cell indicator list in above item (1-4) indicates a range. If the second sidelink terminal is within the range, it is to report the resource sensing result to the first sidelink terminal. When the second sidelink terminal leaves the range, it stops reporting the resource sensing result to the first sidelink terminal.

At step 120, the resource sensing indication information is transmitted to a second sidelink terminal, and the resource sensing indication information is used to instruct the second sidelink terminal to perform resource sensing according to the resource sensing indication information and return an obtained resource sensing result to the first sidelink terminal.

At step 130, the resource sensing result returned by the second sidelink terminal is received.

At step 140, a sidelink resource for sidelink communication is selected according to the resource sensing result from the second sidelink terminal.

In an example scenario, as shown in FIG. 2, User Equipment (UE for short) A and UE B are involved. UE A represents a first sidelink terminal, and UE B represents a second sidelink terminal. When configuring a sidelink resource, UE A can generate resource sensing indication information and transmit the resource sensing indication information to UE B; in response to a receipt of the resource sensing indication information, UE B may perform resource sensing based on the resource sensing indication information and return an obtained resource sensing result to UE A; in response to a receipt of the resource sensing result returned by UE B, UE A may select the sidelink resource for sidelink communication according to the resource sensing result from the second sidelink terminal. In addition, if UE A and UE B are in unicast connection, they can transmit the resource sensing indication information and the resource sensing result through a Radio Resource Control (RRC for short) message. Moreover, in response to a receipt of the resource sensing indication information, UE B can perform corresponding resource sensing according to specific content included in the resource sensing indication information.

For example, UE A transmits resource sensing indication information to UE B, so to instruct UE B to periodically transmit resource sensing results. A specified first period included in the resource sensing indication information is of 1000 milliseconds, a specified sensing resource range indicates a fourth transmission resource pool for Vehicle to Everything (V2X for short) in a cell broadcast, and a specified QoS indicator is of 3. In response to a receipt of the resource sensing indication information, UE B may find the fourth transmission resource pool for V2X in the cell broadcast, perform resource sensing on the resource pool, and report a resource sensing result to UE A at a reporting period of 1000 milliseconds.

For another example, UE A transmits resource sensing indication information to UE B, so to instruct UE B to periodically transmit resource sensing results. In the resource sensing indication information, a specified first period is of 1000 milliseconds, a specified sensing resource range indicates a receiving resource pool for Vehicle to Everything (V2X for short) in a cell broadcast, and a specified QoS indicator is of 3. In response to a receipt of the resource sensing indication information, UE B may find the receiving resource pool for V2X in the cell broadcast, perform resource sensing on the resource pool, and report a resource sensing result to UE A at a reporting period of 1000 milliseconds.

For another example, UE A transmits resource sensing indication information to UE B, so to instruct UE B to periodically transmit resource sensing results. In the resource sensing indication information, a specified first period is of 1000 milliseconds, a specified sensing resource range indicates a resource set {subframe 3 to 5, subcarrier 1 to 3}, and a specified QoS indicator is of 3. In response to a receipt of the resource sensing indication information, UE B may perform resource sensing on a resource pool with the sensing resource range {subframe 3 to 5, subcarrier 1 to 3}, and report a resource sensing result to UE A at a reporting period of 1000 milliseconds.

For another example, UE A transmits resource sensing indication information to UE B, so to instruct UE B to periodically transmit resource sensing results. In the resource sensing indication information, a specified first period is of 1000 milliseconds, a specified sensing resource range indicates a receiving resource pool for Vehicle to Everything (V2X for short) in a cell broadcast, a specified QoS indicator is of 3, and a specified cell indicator list indicates a cell set {001, 002, 003}. After UE B receives the resource sensing indication information and detecting that a cell in which it is located has an indicator of 002, it may find the receiving resource pool for V2X in the cell broadcast, perform resource sensing on the resource pool, and report a resource sensing result to UE A at a reporting period of 1000 milliseconds. When moving to a new cell and detecting that the new cell has an indicator of 006, UE B stops resource sensing and does not report a resource sensing result.

It can be seen from the above example that, by generating resource sensing indication information and transmitting the resource sensing indication information to a second sidelink terminal, a first sidelink terminal can, after receiving a resource sensing result returned by the second sidelink terminal, select a sidelink resource for sidelink communication according to the resource sensing result from the second sidelink terminal. In this way, a sidelink resource interference problem at a receiving end is effectively solved, and accuracy of configuration of sidelink resource is also improved. In particular, resource sensing indication information may indicate a resource sensing mode specified by the first sidelink terminal, so that the second sidelink terminal can perform resource sensing according to the specified resource sensing mode and report a resource sensing result, thereby satisfying diversified requirements of the first sidelink terminal, and also improving utility of configuration of sidelink resource.

Figure 3:
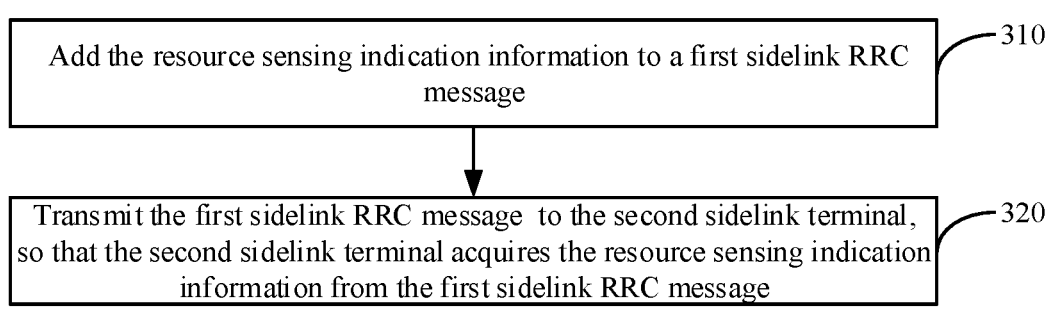
FIG. 3 is a flowchart illustrating another method of configuring sidelink resource according to an example.

FIG. 3 is a flowchart illustrating another method of configuring sidelink resource according to an example. The method of configuring sidelink resource may be applied to a first sidelink terminal, and the first sidelink terminal and a second sidelink terminal are in unicast connection. On the basis of the method shown in FIG. 1, as shown in FIG. 3, step 120, when performed, may include the following steps 310 and 320.

At step 310, the resource sensing indication information is added to a first sidelink Radio Resource Control (RRC) message.

In an example of the present disclosure, a first sidelink terminal and a second sidelink terminal are in unicast connection, and the first sidelink terminal may transmit resource sensing indication information to the second sidelink terminal through a first sidelink RRC message.

At step 320, the first sidelink RRC message is transmitted to the second sidelink terminal, so that the second sidelink terminal acquires the resource sensing indication information from the first sidelink RRC message.

It can be seen from the above example that, in a case that a first sidelink terminal and a second sidelink terminal are in unicast connection, the first sidelink terminal may transmit resource sensing indication information to the second sidelink terminal through a first sidelink RRC message, thereby improving reliability of transmission of the resource sensing indication information.

Figure 4:
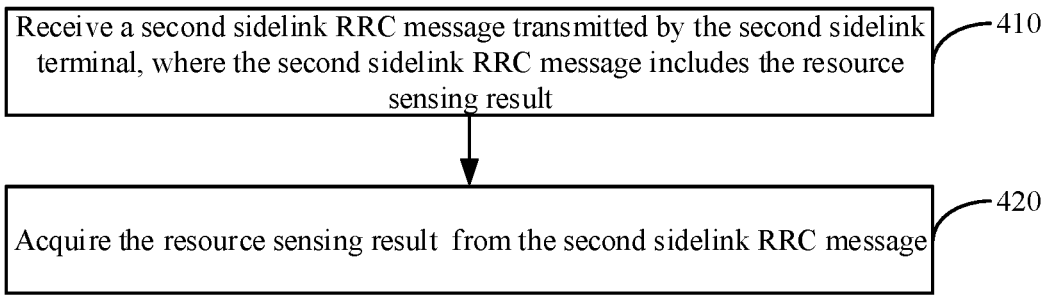
FIG. 4 is a flowchart illustrating another method of configuring sidelink resource according to an example.

FIG. 4 is a flowchart illustrating another method of configuring sidelink resource according to an example. The method of configuring sidelink resource may be applied to a first sidelink terminal, and the first sidelink terminal and a second sidelink terminal are in unicast connection. On the basis of the method shown in FIG. 1, as shown in FIG. 4, step 130, when performed, may include the following steps 410 and 420.

At step 410, a second sidelink RRC message transmitted by the second sidelink terminal is received, where the second sidelink RRC message includes the resource sensing result.

In an example of the present disclosure, a first sidelink terminal and a second sidelink terminal are in unicast connection, the second sidelink terminal may transmit a resource sensing result to the first sidelink terminal through a second sidelink RRC message. Correspondingly, in response to a receipt of the second sidelink RRC message by the first sidelink terminal, the first sidelink terminal may acquire the resource sensing result from the second sidelink RRC message.

At step 420, the resource sensing result is acquired from the second sidelink RRC message.

It can be seen from the above example that, in a case that a first sidelink terminal and a second sidelink terminal are in unicast connection, the first sidelink terminal may acquire the resource sensing result from the second sidelink RRC message transmitted by the second sidelink terminal, thereby improving accuracy of acquisition of resource sensing result.

Figure 5:
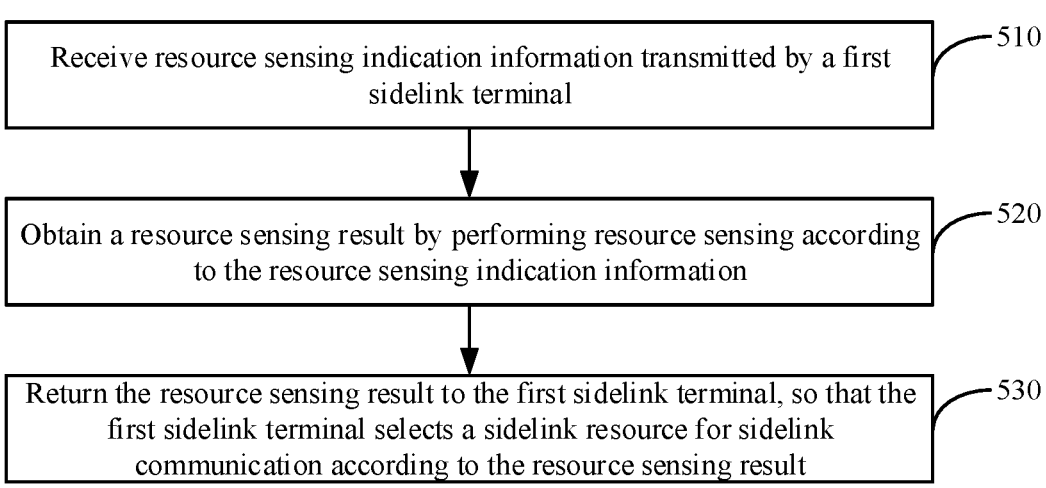
FIG. 5 is a flowchart illustrating a method of configuring sidelink resource according to an example.

FIG. 5 is a flowchart illustrating a method of configuring sidelink resource according to an example, the method of configuring sidelink resource may be applied to a second sidelink terminal. As shown in FIG. 5, the method of configuring sidelink resource may include following steps 510 to 530.

At step 510, resource sensing indication information transmitted by a first sidelink terminal is received.

In an example of the present disclosure, the first sidelink terminal may represent a transmission end of sidelink communication, and the second sidelink terminal may represent a receiving end of sidelink communication. The first sidelink terminal transmits the resource sensing indication information to the second sidelink terminal to instruct the second sidelink terminal to perform resource sensing and return an obtained resource sensing result to the first sidelink terminal, and select a sidelink resource for sidelink communication according to the resource sensing result from the second sidelink terminal.

At step 520, a resource sensing result is obtained by performing resource sensing according to the resource sensing indication information.

In an example of the present disclosure, though resource sensing indication information may instruct a second sidelink terminal to perform resource sensing and return an obtained resource sensing result to a first sidelink terminal, for the mode in which the second sidelink terminal performs resource sensing, it can be determined by the second sidelink terminal according to actual situation.

For example, if a first sidelink terminal specifies a specific resource sensing mode, a second sidelink terminal may perform resource sensing according to the resource sensing mode specified by the first sidelink terminal.

For another example, a second sidelink terminal may perform resource sensing according to a resource sensing mode specified in a communication protocol.

For another example, a second sidelink terminal may perform resource sensing according to a resource sensing mode pre-agreed by a first sidelink terminal and the second sidelink terminal.

For another example, a second sidelink terminal can autonomously determine a specific resource sensing mode, and transmit the autonomously determined resource sensing mode along with a resource sensing result to a first sidelink terminal, so to facilitate the first sidelink terminal to learn the resource sensing mode used by the second sidelink terminal for obtaining the resource sensing result in time.

In an example, the first sidelink terminal specifies a specific resource sensing mode, and the resource sensing indication information in step 510 may include, but is not limited to, at least one of the following: (2-1) a specified first period that represents a reporting period specified for the second sidelink terminal periodically reporting the resource sensing result to the first sidelink terminal; (2-2) a specified QoS indicator that indicates a QoS basis specified for the second sidelink terminal performing resource sensing; (2-3) a specified sensing resource range; and (2-4) a specified cell indicator list that includes one or more cell indicators indicating one or more specified cells for which the second sidelink terminal is to perform resource sensing.

The first period in above item (2-1) may be a time value. For example, the first period is 1000 milliseconds. The QoS indicator in above item (2-2) can be a numerical value, and each numerical value represents a corresponding QoS requirement, including delay, rate, reliability, and so on. The QoS indicator may be 5QI, or PPPP. For example, the 5QI may be indicated by a value 3. The specified sensing resource range in above item (2-3) may include a specified resource indicator indicating a transmission resource pool and/or a receiving resource pool carried in a cell broadcast; and/or a specified resource pool configuration. The cell indicator list in above item (2-4) indicates a range. If the second sidelink terminal is within the range, it is to report the resource sensing result to the first sidelink terminal. When the second sidelink terminal leaves the range, it stops reporting the resource sensing result to the first sidelink terminal.

In an example, corresponding to above item (2-2), if the resource sensing indication information include the specified QoS indicator that indicates a QoS basis specified for the second sidelink terminal performing resource sensing; the step 520, when performed, may include the following resource sensing mode:

(3-1) performing resource sensing according to the specified QoS indicator.

In an example, corresponding to above item (2-3), if the resource sensing indication information include a specified sensing resource range; the step 520, when performed, may include the following resource sensing mode:

(4-1) performing resource sensing within the specified sensing resource range.

In an example, the specified sensing resource range in above item (4-1) may include a specified resource indicator indicating a transmission resource pool and/or a receiving resource pool carried in a cell broadcast; and/or a specified resource pool configuration.

In an example, corresponding to above item (2-4), if the resource sensing indication information includes a specified cell indicator list that includes one or more cell indicators indicating one or more specified cells for which the second sidelink terminal is to perform resource sensing; the step 520, when performed, may include the following resource sensing mode:

(5-1) determining each of the specified cells according to the specified cell indicator list;

(5-2) when determining that a cell where the second sidelink terminal is currently located is one of the specified cells, performing resource sensing;

(5-3) when determining that the cell where the second sidelink terminal is currently located is not any of the specified cells, not performing resource sensing until the second sidelink terminal moves to one of the specified cells.

At step 530, the resource sensing result is returned to the first sidelink terminal, so that the first sidelink terminal selects a sidelink resource for sidelink communication according to the resource sensing result.

In an example, corresponding to above item (2-2), if the resource sensing indication information includes a specified first period that represents a reporting period specified for the second sidelink terminal periodically reporting the resource sensing result to the first sidelink terminal; the step 520, when performed, may include the following resource reporting mode:

(6-1) returning the resource sensing result to the first sidelink terminal at the first period.

It can be seen from the above example that, in response to a receipt of resource sensing indication information transmitted by a first sidelink terminal, a resource sensing result may be obtained by performing resource sensing according to the resource sensing indication information and the resource sensing result may be returned to the first sidelink terminal, so that the first sidelink terminal selects a sidelink resource for sidelink communication according to the resource sensing result from a second sidelink terminal. In this way, a sidelink resource interference problem at a receiving end is effectively solved, and accuracy of configuring sidelink resource is also improved. In particular, resource sensing indication information may include a resource sensing mode specified by a first sidelink terminal, so that the second sidelink terminal can perform resource sensing according to the specified resource sensing mode and report a resource sensing result, thereby satisfying diversified requirements of the first sidelink terminal, and also improving utility of configuration of sidelink resource.

Figure 6:
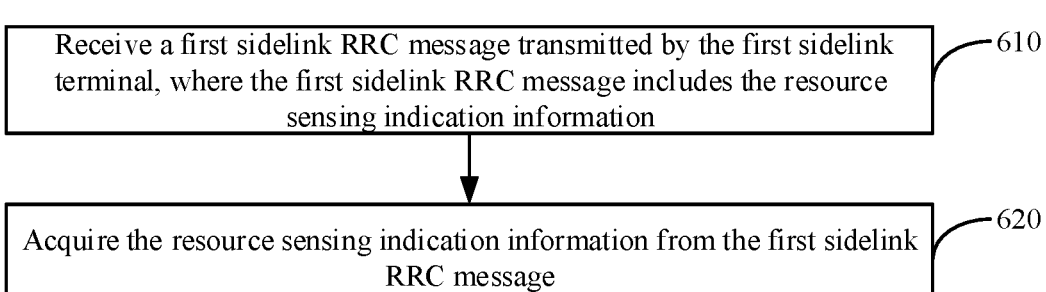
FIG. 6 is a flowchart illustrating another method of configuring sidelink resource according to an example.

FIG. 6 is a flowchart illustrating another method of configuring sidelink resource according to an example, the method of configuring sidelink resource may be applied to a second sidelink terminal, and the second sidelink terminal and a first sidelink terminal are in unicast connection. On the basis of the method shown in FIG. 5, as shown in FIG. 6, step 510, when performed, may include the following steps 610 and 620.

At step 610, a first sidelink RRC message transmitted by the first sidelink terminal is received, where the first sidelink RRC message includes the resource sensing indication information.

In an example of the present disclosure, a first sidelink terminal and a second sidelink terminal are in unicast connection, and the first sidelink terminal may transmit resource sensing indication information to the second sidelink terminal through a first sidelink RRC message. Correspondingly, in response to a receipt of the first sidelink RRC message, the second sidelink terminal may acquire the resource sensing indication information from the first sidelink RRC message.

At step 620, the resource sensing indication information is acquired from the first sidelink RRC message.

It can be seen from the above example that, in a case that a first sidelink terminal and a second sidelink terminal are in unicast connection, resource sensing indication information can be acquired from a first sidelink RRC message transmitted by the first sidelink terminal, thereby improving accuracy of acquisition of resource sensing indication information.

Figure 7:
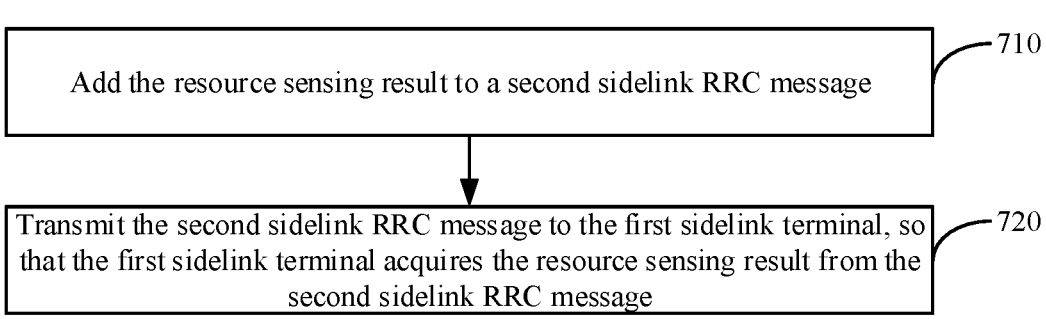
FIG. 7 is a flowchart illustrating another method of configuring sidelink resource according to an example.

FIG. 7 is a flowchart illustrating another method of configuring sidelink resource according to an example, the method of configuring sidelink resource may be applied to a second sidelink terminal, and the second sidelink terminal and a first sidelink terminal are in unicast connection. On the basis of the method shown in FIG. 5, as shown in FIG. 7, step 530, when performed, may include the following steps 710 and 720.

At step 710, the resource sensing result is added to a second sidelink RRC message.

In an example of the present disclosure, a first sidelink terminal and a second sidelink terminal are in unicast connection, and the second sidelink terminal may transmit a resource sensing result to the first sidelink terminal through a second sidelink RRC message.

At step 720, the second sidelink RRC message is transmitted to the first sidelink terminal, so that the first sidelink terminal acquires the resource sensing result from the second sidelink RRC message.

It can be seen from the above example that, in a case that a first sidelink terminal and a second sidelink terminal are in unicast connection, a resource sensing result is transmitted to the first sidelink terminal through a second sidelink RRC message, thereby improving reliability of transmission of resource sensing result.

Corresponding to the examples of methods of configuring sidelink resource, the present disclosure also provides examples of apparatuses for configuring sidelink resource.

Figure 8:
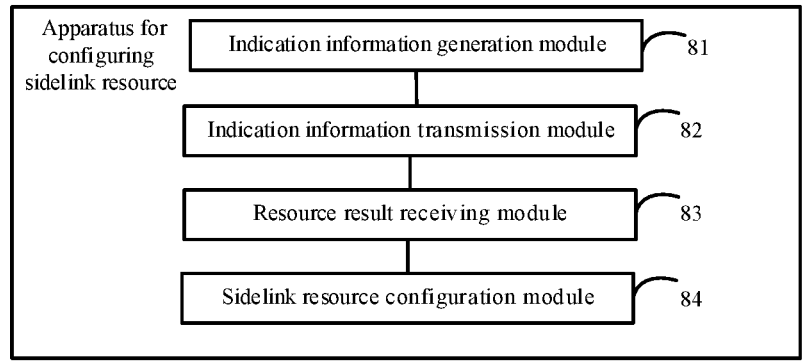
FIG. 8 is a block diagram illustrating an apparatus for configuring sidelink resource according to an example.

FIG. 8 is a block diagram illustrating an apparatus for configuring sidelink resource according to an example, the apparatus may be applied to a first sidelink terminal and used to perform the method of configuring sidelink resource as shown in FIG. 1. As shown in FIG. 8, the apparatus for configuring sidelink resource may include:

an indication information generation module 81, configured to generate resource sensing indication information;

an indication information transmission module 82, configured to transmit the resource sensing indication information to a second sidelink terminal, where the resource sensing indication information is to instruct the second sidelink terminal to perform resource sensing according to the resource sensing indication information and return an obtained resource sensing result to the first sidelink terminal.

a resource result receiving module 83, configured to receive the resource sensing result returned by the second sidelink terminal; and a sidelink resource configuration module 84, configured to select a sidelink resource for sidelink communication according to the resource sensing result.

In an example, on the basis of the apparatus shown in FIG. 8, the resource sensing indication information may include, but is not limited to, at least one of:

a specified first period that represents a reporting period specified for the second sidelink terminal periodically reporting the resource sensing result to the first sidelink terminal;

a specified QoS indicator that indicates a QoS basis specified for the second sidelink terminal performing resource sensing;

a specified sensing resource range; or a specified cell indicator list that includes one or more cell indicators indicating one or more specified cells for which the second sidelink terminal is to perform resource sensing.

In an example, the specified sensing resource range includes a specified resource indicator indicating at least one of: at least one of a transmission resource pool and a receiving resource pool carried in a cell broadcast; or a specified resource pool configuration.

It can be seen from the above example that, by generating resource sensing indication information and transmitting the resource sensing indication information to a second sidelink terminal, a first sidelink terminal can, after receiving a resource sensing result returned by the second sidelink terminal, select a sidelink resource for sidelink communication according to the resource sensing result from the second sidelink terminal. In this way, a sidelink resource interference problem at a receiving end is effectively solved, and accuracy of configuration of sidelink resource is also improved. In particular, resource sensing indication information may indicate a resource sensing mode specified by the first sidelink terminal, so that the second sidelink terminal can perform resource sensing according to the specified resource sensing mode and report a resource sensing result, thereby satisfying diversified requirements of the first sidelink terminal, and also improving utility of configuration of sidelink resource.

Figure 9:
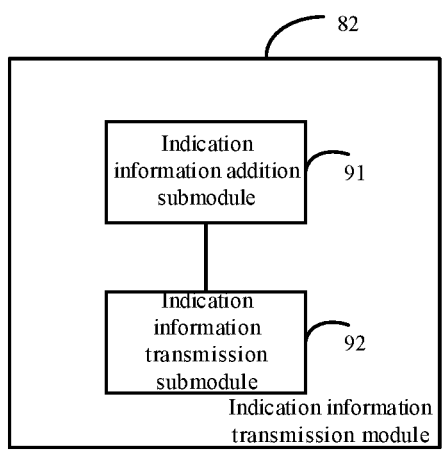
FIG. 9 is a block diagram illustrating another apparatus for configuring sidelink resource according to an example.

In an example, on the basis of the apparatus shown in FIG. 8, as shown in FIG. 9, the first sidelink terminal and the second sidelink terminal are in unicast connection; the indication information transmission module 82 may include:

an indication information addition submodule 91, configured to add the resource sensing indication information to a first sidelink RRC message; and an indication information transmission submodule 92, configured to transmit the first sidelink RRC message to the second sidelink terminal, so that the second sidelink terminal acquires the resource sensing indication information from the first sidelink RRC message.

It can be seen from the above example that, in a case that a first sidelink terminal and a second sidelink terminal are in unicast connection, the first sidelink terminal may transmit resource sensing indication information to the second sidelink terminal through a first sidelink RRC message, thereby improving reliability of transmission of the resource sensing indication information.

Figure 10:
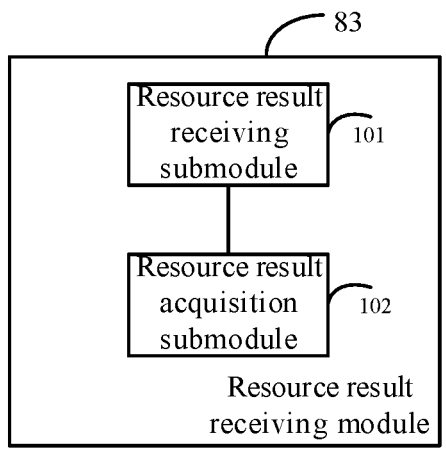
FIG. 10 is a block diagram illustrating another apparatus for configuring sidelink resource according to an example.

In an example, on the basis of the apparatus shown in FIG. 8, as shown in FIG. 10, the first sidelink terminal and the second sidelink terminal are in unicast connection; the resource result receiving module 83 may include:

a resource result receiving submodule 101, configured to receive a second sidelink RRC message transmitted by the second sidelink terminal, where the second sidelink RRC message includes the resource sensing result; and a resource result acquisition submodule 102, configured to acquire the resource sensing result from the second sidelink RRC message.

It can be seen from the above example that, in a case that a first sidelink terminal and a second sidelink terminal are in unicast connection, the first sidelink terminal may acquire the resource sensing result from the second sidelink RRC message transmitted by the second sidelink terminal, thereby improving accuracy of acquisition of resource sensing result.

Figure 11:
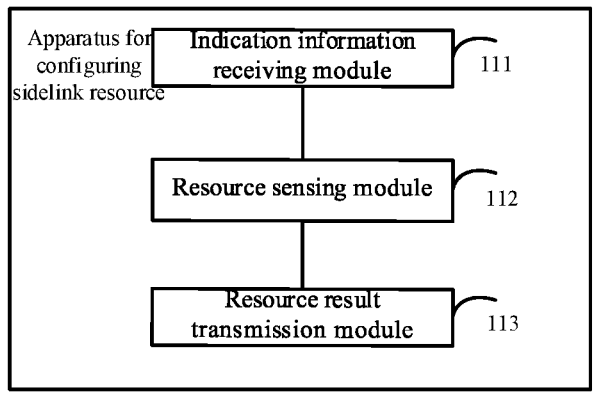
FIG. 11 is a block diagram illustrating an apparatus for configuring sidelink resource according to an example.

FIG. 11 is a block diagram illustrating an apparatus for configuring sidelink resource according to an example, the apparatus may be applied to a second sidelink terminal and used to perform the method of configuring sidelink resource as shown in FIG. 5. As shown in FIG. 11, the apparatus for configuring sidelink resource may include:

an indication information receiving module 111, configured to receive resource sensing indication information transmitted by a first sidelink terminal;

a resource sensing module 112, configured to obtain a resource sensing result by performing resource sensing according to the resource sensing indication information; and a resource result transmission module 113, configured to return the resource sensing result to the first sidelink terminal, so that the first sidelink terminal selects a sidelink resource for sidelink communication according to the resource sensing result.

Figure 12:
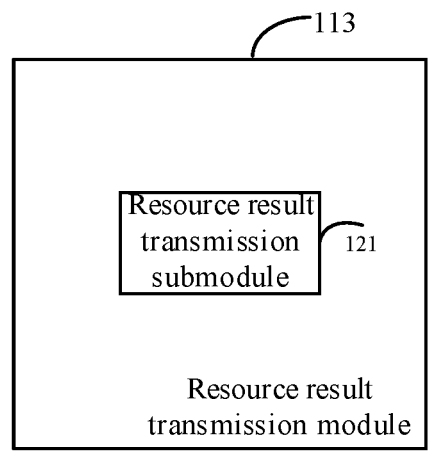
FIG. 12 is a block diagram illustrating another apparatus for configuring sidelink resource according to an example.

In an example, on the basis of the apparatus shown in FIG. 11, as shown in FIG. 12, the resource sensing indication information includes a specified first period that represents a reporting period specified for the second sidelink terminal periodically reporting the resource sensing result to the first sidelink terminal; the resource result transmission module 113 may include:

a resource result transmission submodule 121, configured to return the resource sensing result to the first sidelink terminal at the first period.

Figure 13:
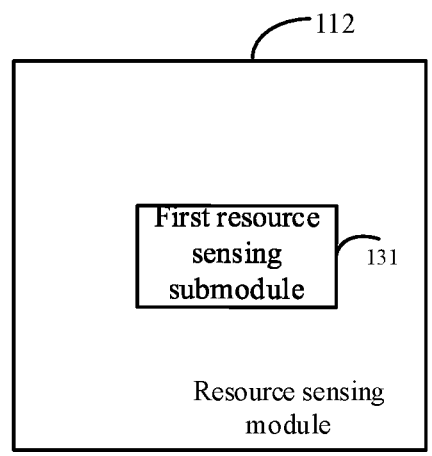
FIG. 13 is a block diagram illustrating another apparatus for configuring sidelink resource according to an example.

In an example, on the basis of the apparatus shown in FIG. 11, as shown in FIG. 13, the resource sensing indication information includes a specified QoS indicator that indicates a QoS basis specified for the second sidelink terminal performing resource sensing; the resource sensing module 112 may include:

a first resource sensing submodule 131, configured to perform resource sensing according to the specified QoS indicator.

Figure 14:
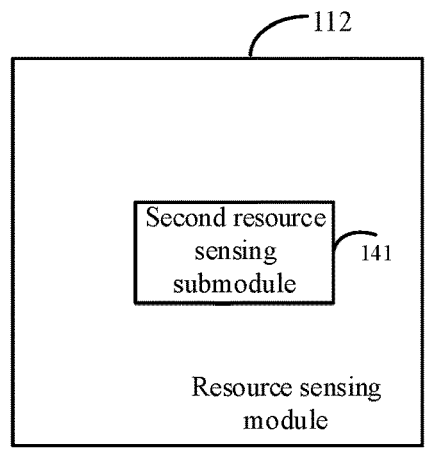
FIG. 14 is a block diagram illustrating another apparatus for configuring sidelink resource according to an example.

In an example, on the basis of the apparatus shown in FIG. 11, as shown in FIG. 14, the resource sensing indication information includes a specified sensing resource range; the resource sensing module 112 may include:

a second resource sensing submodule 141, configured to perform resource sensing within the specified sensing resource range.

In an example, on the basis of the apparatus shown in FIG. 14, the specified sensing resource range includes a specified resource indicator for indicating at least one of: at least one of a transmission resource pool and a receiving resource pool carried in a cell broadcast; or a specified resource pool configuration.

Figure 15:
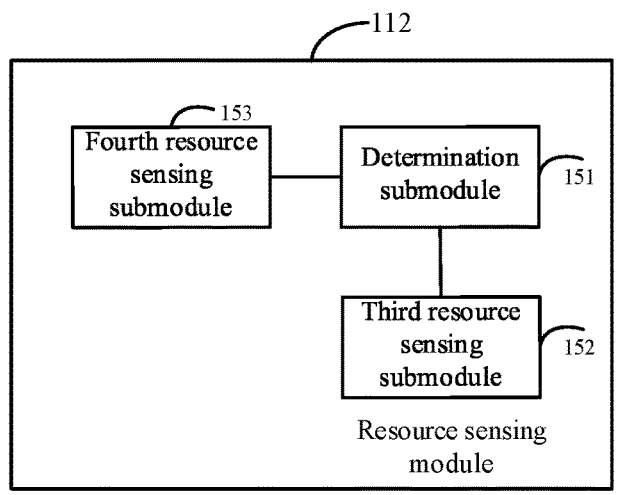
FIG. 15 is a block diagram illustrating another apparatus for configuring sidelink resource according to an example.

In an example, on the basis of the apparatus shown in FIG. 11, as shown in FIG. 15, the resource sensing indication information includes a specified cell indicator list that includes one or more cell indicators indicating one or more specified cells for which the second sidelink terminal is to perform resource sensing; the resource sensing module 112 may include:

- a determination submodule 151, configured to determine each of the specified cells according to the specified cell indicator list;
- a third resource sensing submodule 152, configured to in response to determining that a cell where the second sidelink terminal is currently located is one of the specified cells, perform resource sensing; and
- a fourth resource sensing submodule 153, configured to in response to determining that the cell where the second sidelink terminal is currently located is not any of the specified cells, not perform resource sensing until the second sidelink terminal moves to one of the specified cells.

It can be seen from the above example that, in response to a receipt of resource sensing indication information transmitted by a first sidelink terminal, a resource sensing result may be obtained by performing resource sensing according to the resource sensing indication information and the resource sensing result may be returned to the first sidelink terminal, so that the first sidelink terminal selects a sidelink resource for sidelink communication according to the resource sensing result from a second sidelink terminal. In this way, a sidelink resource interference problem at a receiving end is effectively solved, and accuracy of configuring sidelink resource is also improved. In particular, resource sensing indication information may include a resource sensing mode specified by a first sidelink terminal, so that the second sidelink terminal can perform resource sensing according to the specified resource sensing mode and report a resource sensing result, thereby satisfying diversified requirements of the first sidelink terminal, and also improving utility of configuration of sidelink resource.

Figure 16:
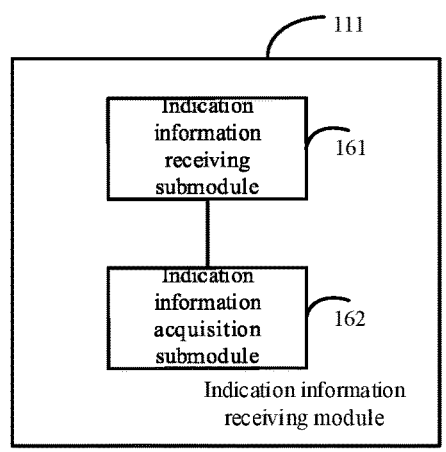
FIG. 16 is a block diagram illustrating another apparatus for configuring sidelink resource according to an example.

In an example, on the basis of the apparatus shown in FIG. 11, as shown in FIG. 16, the first sidelink terminal and the second sidelink terminal are in unicast connection; the indication information receiving module 111 may include:

- an indication information receiving submodule 161, configured to receive a first sidelink RRC message transmitted by the first sidelink terminal, where the first sidelink RRC message includes the resource sensing indication information; and
- an indication information acquisition submodule 162, configured to acquire the resource sensing indication information from the first sidelink RRC message.

It can be seen from the above example that, in a case that a first sidelink terminal and a second sidelink terminal are in unicast connection, resource sensing indication information can be acquired from a first sidelink RRC message transmitted by the first sidelink terminal, thereby improving accuracy of acquisition of resource sensing indication information.

Figure 17:
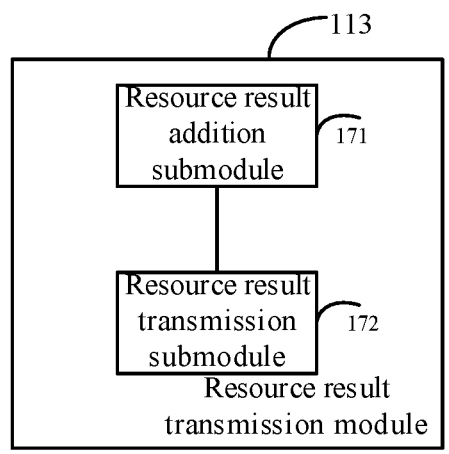
FIG. 17 is a block diagram illustrating another apparatus for configuring sidelink resource according to an example.

In an example, on the basis of the apparatus shown in FIG. 11, as shown in FIG. 17, the first sidelink terminal and the second sidelink terminal are in unicast connection; the resource result transmission module 113 may include:

- a resource result addition submodule 171, configured to add the resource sensing result to a second sidelink Radio Resource Control RRC message; and
- a resource result transmission submodule 172, configured to transmit the second sidelink RRC message to the first sidelink terminal, so that the first sidelink terminal acquires the resource sensing result from the second sidelink RRC message.

It can be seen from the above example that, in a case that a first sidelink terminal and a second sidelink terminal are in unicast connection, a resource sensing result is transmitted to the first sidelink terminal through a second sidelink RRC message, thereby improving reliability of transmission of resource sensing result.

For the apparatus embodiment, since the apparatus substantially corresponds to the method embodiment, reference may be made to some description of the method embodiment. The apparatus embodiments described above are merely schematic, in which the units described as separate components may or may not be physically separated, and the components displayed as units may or may not be physical units, may be located in one place, or may be distributed to a plurality of network units. Some or all of the modules may be selected according to actual needs to achieve the solution of the present disclosure, which a person of ordinary skill in the art would understand and implement without creative efforts.

The present disclosure provides a non-transitory computer readable storage medium storing computer programs, where the computer programs are used to perform the method of configuring sidelink resource according to any of FIG. 1 to FIG. 4.

The present disclosure provides a non-transitory computer readable storage medium storing computer programs, where the computer programs are used to perform the method of configuring sidelink resource according to any of FIG. 5 to FIG. 7.

The present disclosure provides an apparatus for configuring sidelink resource applied to a first sidelink terminal, including:

a processor; and
a memory storing instructions executable by the processor,
where the processor is configured to:
generate resource sensing indication information;
transmit the resource sensing indication information to a second sidelink terminal, where the resource sensing indication information is to instruct the second sidelink terminal to perform resource sensing according to the resource sensing indication information and return an obtained resource sensing result to the first sidelink terminal;
receive the resource sensing result returned by the second sidelink terminal; and
select a sidelink resource for sidelink communication according to the resource sensing result.

Figure 18:
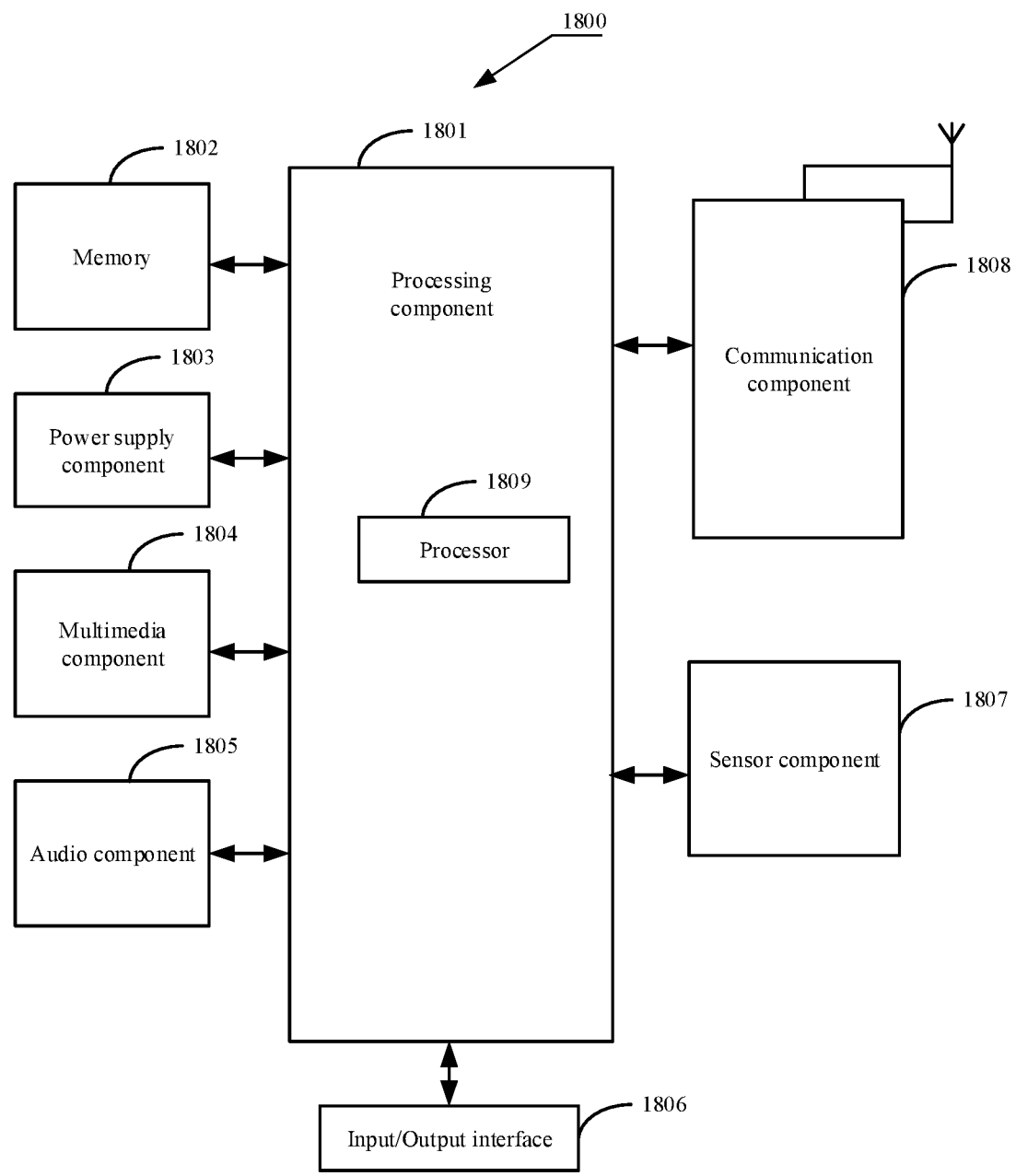
FIG. 18 is a schematic structural diagram illustrating an apparatus for configuring sidelink resource according to an example.

FIG. 18 is a schematic structural diagram illustrating an apparatus for configuring sidelink resource according to an example. The apparatus 1800 may be provided as a first sidelink terminal. As shown in FIG. 18, an apparatus for configuring sidelink resource 1800 according to an example may be a terminal such as a computer, a mobile phone, a digital broadcast terminal, a message transceiving device, a game console, a tablet device, a medical equipment, a fitness equipment and a personal digital assistant.

As shown in FIG. 18, the apparatus 1800 may include one or more of the following components: a processing component 1801, a memory 1802, a power supply component 1803, a multimedia component 1804, an audio component 1805, an input/output (I/O) interface 1806, a sensor component 1807 and a communication component 1808.

The processing component 1801 generally controls overall operations of the apparatus 1800, such as operations associated with display, phone calls, data communications, camera operations, and recording operations. The processing component 1801 may include one or more processors 1809 to execute instructions so as to complete all or part of the steps of the above methods. In addition, the processing component 1801 may include one or more modules to facilitate the interaction between the processing component 1801 and other components. For example, the processing component 1801 may include a multimedia module to facilitate the interaction between the multimedia component 1804 and the processing component 1801.

The memory 1802 is configured to store various types of data to support the operation of the apparatus 1800. Examples of such data include instructions for any application or method operated on the apparatus 1800, contact data, phonebook data, messages, pictures, videos, and so on. The memory 1802 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1803 supplies power for different components of the apparatus 1800. The power supply component 1803 may include a power supply management system, one or more power supplies, and other components associated with generating, managing and distributing power for the apparatus 1800.

The multimedia component 1804 includes a screen providing an output interface between the apparatus 1800 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1804 may include a front camera and/or a rear camera. The front camera and/or rear camera may receive external multimedia data when the apparatus 1800 is in an operating mode, such as a photographing mode or a video mode. Each of the front camera and the rear camera may be a fixed optical lens system or have focal length and optical zooming capability.

The audio component 1805 is to output and/or input an audio signal. For example, the audio component 1805 includes a microphone (MIC). When the apparatus 1800 is in an operating mode, such as a call mode, a record mode and a voice recognition mode, the microphone is to receive an external audio signal. The received audio signal may be further stored in the memory 1802 or sent via the communication component 1808. In some examples, the audio component 1805 further includes a speaker for outputting an audio signal.

The I/O interface 1806 provides an interface between the processing component 1801 and a peripheral interface module. The above peripheral interface module may be a keyboard, a click wheel, buttons, or the like. These buttons may include but not limited to, a home button, a volume button, a start button and a lock button.

The sensor component 1807 includes one or more sensors to provide status assessments of various aspects for the apparatus 1800. For example, the sensor component 1807 may detect the on/off status of the apparatus 1800, and relative positioning of the component, for example, the component is a display and a keypad of the apparatus 1800. The sensor component 1807 may also detect a change in position of the apparatus 1800 or a component of the apparatus 1800, a presence or absence of the contact between a user and the apparatus 1800, an orientation or an acceleration/deceleration of the apparatus 1800, and a change in temperature of the apparatus 1800. The sensor component 1807 may include a proximity sensor to detect the presence of a nearby object without any physical contact. The sensor component 1807 may further include an optical sensor, such as a Complementary Metal-Oxide-Semiconductor (CMOS) or Charged Coupled Device (CCD) image sensor which is used in imaging applications. In some examples, the sensor component 1807 may further include an acceleration sensor, a gyroscope sensor, a magnetic sensor, a pressure sensor, or a temperature sensor.

The communication component 1808 is to facilitate wired or wireless communication between the apparatus 1800 and other devices. The apparatus 1800 may access a wireless network based on a communication standard, such as Wi-Fi, 2G, 3G, 4G or 5G, or a combination thereof. In an example, the communication component 1808 receives a broadcast signal or broadcast related information from an external broadcast management system via a broadcast channel. In an example, the communication component 1808 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 1800 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 1802 including instructions. The above instructions may be executed by the processor 1809 of the apparatus 1800 to complete the above method. For example, the non-transitory computer readable storage medium may be a Read-Only Memory (ROM), a Random Access Memory (RAM), a CD-ROM, a magnetic tape, a floppy disk, an optical data storage device, and the like.

The instructions in the storage medium, when executed by the processor, cause the apparatus 1800 to perform any of the above methods of configuring sidelink resource.

Correspondingly, the present disclosure provides an apparatus for configuring sidelink resource applied to a second sidelink terminal, including:

a processor; and a memory storing instructions executable by the processor, where the processor is configured to:

receive resource sensing indication information transmitted by a first sidelink terminal;

obtain a resource sensing result by performing resource sensing according to the resource sensing indication information; and return the resource sensing result to the first sidelink terminal, so that the first sidelink terminal selects a sidelink resource for sidelink communication according to the resource sensing result.

Figure 19:
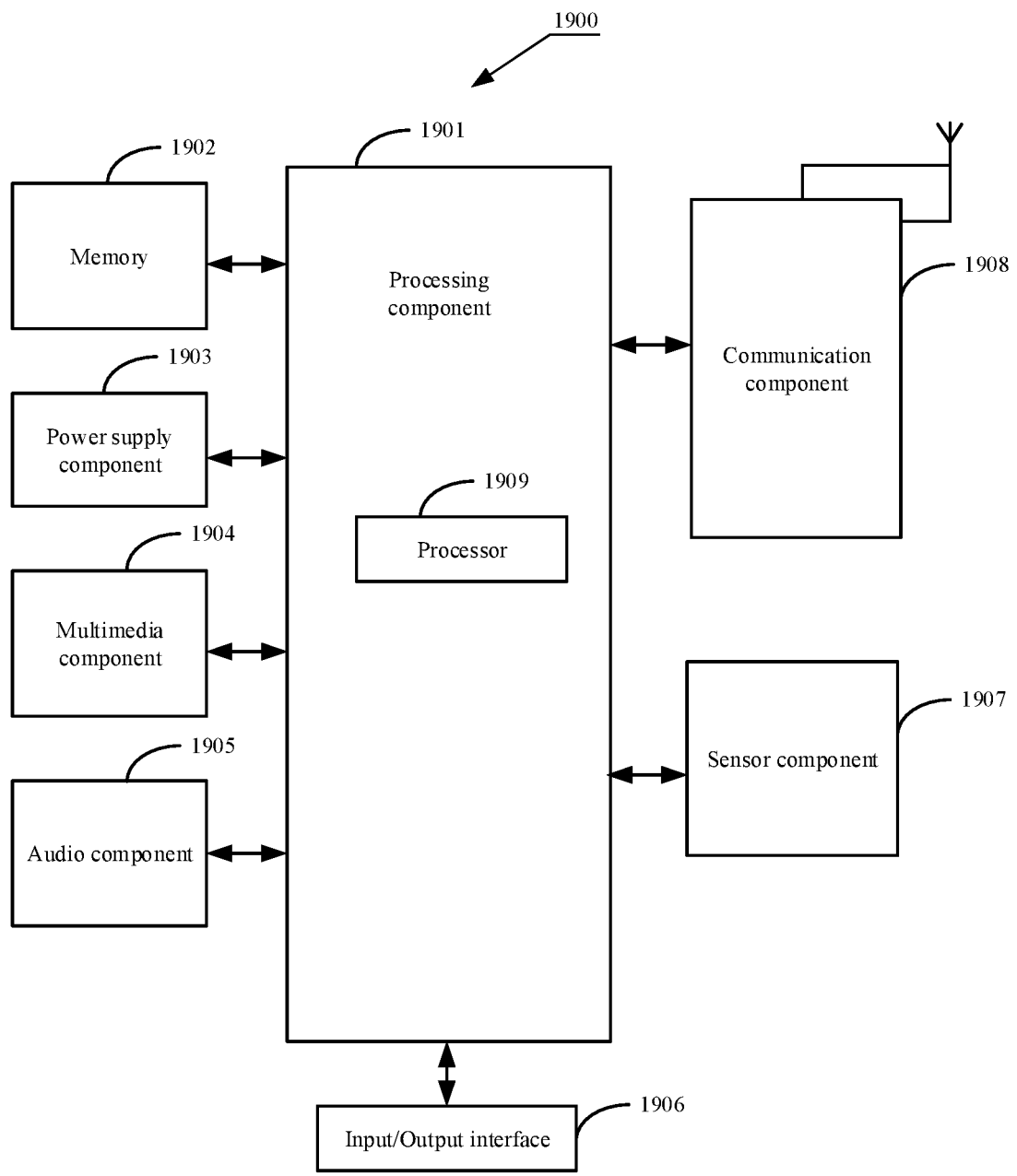
FIG. 19 is a schematic structural diagram illustrating an apparatus for configuring sidelink resource according to an example.

FIG. 19 is a schematic structural diagram illustrating an apparatus for configuring sidelink resource according to an example. The apparatus 1900 may be provided as a second sidelink terminal. As shown in FIG. 19, an apparatus for configuring sidelink resource 1900 according to an example may be a terminal such as a computer, a mobile phone, a digital broadcast terminal, a message transceiving device, a game console, a tablet device, a medical equipment, a fitness equipment and a personal digital assistant.

As shown in FIG. 19, the apparatus 1900 may include one or more of the following components: a processing component 1901, a memory 1902, a power supply component 1903, a multimedia component 1904, an audio component 1905, an input/output (I/O) interface 1906, a sensor component 1907 and a communication component 1908.

The processing component 1901 generally controls overall operations of the apparatus 1900, such as operations associated with display, phone calls, data communications, camera operations, and recording operations. The processing component 1901 may include one or more processors 1909 to execute instructions so as to complete all or part of the steps of the above methods. In addition, the processing component 1901 may include one or more modules to facilitate the interaction between the processing component 1901 and other components. For example, the processing component 1901 may include a multimedia module to facilitate the interaction between the multimedia component 1904 and the processing component 1901.

The memory 1902 is configured to store various types of data to support the operation of the apparatus 1900. Examples of such data include instructions for any application or method operated on the apparatus 1900, contact data, phonebook data, messages, pictures, videos, and so on. The memory 1902 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1903 supplies power for different components of the apparatus 1900. The power supply component 1903 may include a power supply management system, one or more power supplies, and other components associated with generating, managing and distributing power for the apparatus 1900.

The multimedia component 1904 includes a screen providing an output interface between the apparatus 1900 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1904 may include a front camera and/or a rear camera. The front camera and/or rear camera may receive external multimedia data when the apparatus 1900 is in an operating mode, such as a photographing mode or a video mode. Each of the front camera and the rear camera may be a fixed optical lens system or have focal length and optical zooming capability.

The audio component 1905 is to output and/or input an audio signal. For example, the audio component 1905 includes a microphone (MIC). When the apparatus 1900 is in an operating mode, such as a call mode, a record mode and a voice recognition mode, the microphone is to receive an external audio signal. The received audio signal may be further stored in the memory 1902 or sent via the communication component 1908. In some examples, the audio component 1905 further includes a speaker for outputting an audio signal.

The I/O interface 1906 provides an interface between the processing component 1901 and a peripheral interface module. The above peripheral interface module may be a keyboard, a click wheel, buttons, or the like. These buttons may include but not limited to, a home button, a volume button, a start button and a lock button.

The sensor component 1907 includes one or more sensors to provide status assessments of various aspects for the apparatus 1900. For example, the sensor component 1907 may detect the on/off status of the apparatus 1900, and relative positioning of the component, for example, the component is a display and a keypad of the apparatus 1900. The sensor component 1907 may also detect a change in position of the apparatus 1900 or a component of the apparatus 1900, a presence or absence of the contact between a user and the apparatus 1900, an orientation or an acceleration/deceleration of the apparatus 1900, and a change in temperature of the apparatus 1900. The sensor component 1907 may include a proximity sensor to detect the presence of a nearby object without any physical contact. The sensor component 1907 may further include an optical sensor, such as a Complementary Metal-Oxide-Semiconductor (CMOS) or Charged Coupled Device (CCD) image sensor which is used in imaging applications. In some examples, the sensor component 1907 may further include an acceleration sensor, a gyroscope sensor, a magnetic sensor, a pressure sensor, or a temperature sensor.

The communication component 1908 is to facilitate wired or wireless communication between the apparatus 1900 and other devices. The apparatus 1900 may access a wireless network based on a communication standard, such as Wi-Fi, 2G, 3G, 4G or 5G, or a combination thereof. In an example, the communication component 1908 receives a broadcast signal or broadcast related information from an external broadcast management system via a broadcast channel. In an example, the communication component 1908 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 1900 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 1902 including instructions. The above instructions may be executed by the processor 1909 of the apparatus 1900 to complete the above method. For example, the non-transitory computer readable storage medium may be a Read-Only Memory (ROM), a Random Access Memory (RAM), a CD-ROM, a magnetic tape, a floppy disk, an optical data storage device, and the like.

The instructions in the storage medium, when executed by the processor, cause the apparatus 1900 to perform any of the above methods of configuring sidelink resource.

The technical solutions provided by the embodiments of the present disclosure may include the following beneficial effects.

By generating resource sensing indication information and transmitting the resource sensing indication information to a second sidelink terminal, a first sidelink terminal in the present disclosure can, after receiving a resource sensing result returned by the second sidelink terminal, select a sidelink resource for sidelink communication according to the resource sensing result from the second sidelink terminal. In this way, a sidelink resource interference problem at a receiving end is effectively solved, and accuracy of configuration of sidelink resource is also improved. In particular, resource sensing indication information may indicate a resource sensing mode specified by the first sidelink terminal, so that the second sidelink terminal can perform resource sensing according to the specified resource sensing mode and report a resource sensing result, thereby satisfying diversified requirements of the first sidelink terminal, and also improving utility of configuration of sidelink resource.

In response to a receipt of resource sensing indication information transmitted by a first sidelink terminal, a second sidelink terminal may obtain a resource sensing result by performing resource sensing according to the resource sensing indication information and return the resource sensing result to the first sidelink terminal, so that the first sidelink terminal selects a sidelink resource for sidelink communication according to the resource sensing result from a second sidelink terminal. In this way, a sidelink resource interference problem at a receiving end is effectively solved, and accuracy of configuring sidelink resource is also improved. In particular, resource sensing indication information may include a resource sensing mode specified by a first sidelink terminal, so that the second sidelink terminal can perform resource sensing according to the specified resource sensing mode and report a resource sensing result, thereby satisfying diversified requirements of the first sidelink terminal, and also improving utility of configuration of sidelink resource.

After considering the specification and practicing the present disclosure, the persons skilled in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only and the real scope and spirit of the present disclosure are indicated by the claims of the present disclosure.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of configuring sidelink resource, comprising:
generating, by a first sidelink terminal, resource sensing indication information;
transmitting, by the first sidelink terminal, the resource sensing indication information to a second sidelink terminal, wherein the resource sensing indication information instructs the second sidelink terminal to perform resource sensing according to the resource sensing indication information and return an obtained resource sensing result to the first sidelink terminal; wherein the resource sensing indication information comprises a specified sensing resource range;
receiving, by the first sidelink terminal, the resource sensing result returned by the second sidelink terminal; and
selecting, by the first sidelink terminal, a sidelink resource for sidelink communication according to the resource sensing result;
wherein the resource sensing indication information further comprises at least one of a specified first period representing a reporting period specified for the second sidelink terminal periodically reporting the resource sensing result to the first sidelink terminal, or a specified Quality of Service (QOS) indicator indicating a QoS basis specified for the second sidelink terminal performing resource sensing;
in response to the resource sensing indication information comprising the specified first period,
the resource sensing result is returned by the second sidelink terminal at the first period; and
in response to the resource sensing indication information comprising the specified QoS indicator,
the resource sensing result is obtained by the second sidelink terminal performing resource sensing according to the specified QoS indicator.

2. The method according to claim 1, wherein the resource sensing indication information comprises following parameter:
a specified cell indicator list comprising one or more cell indicators indicating one or more specified cells, wherein the second sidelink terminal performs resource sensing for the one or more specified cells.

3. The method according to claim 2, wherein the specified sensing resource range comprises a specified resource indicator indicating at least one of following parameters:
at least one of a transmission resource pool or a receiving resource pool carried in a cell broadcast; or
a specified resource pool configuration.

4. The method according to claim 1, wherein
the first sidelink terminal and the second sidelink terminal are in unicast connection; and
transmitting the resource sensing indication information to the second sidelink terminal comprises:
adding the resource sensing indication information to a first sidelink Radio Resource Control (RRC) message; and
transmitting the first sidelink RRC message to the second sidelink terminal, so that the second sidelink terminal acquires the resource sensing indication information from the first sidelink RRC message.

5. The method according to claim 1, wherein
the first sidelink terminal and the second sidelink terminal are in unicast connection; and
receiving the resource sensing result returned by the second sidelink terminal comprises:

receiving a second sidelink Radio Resource Control (RRC) message transmitted by the second sidelink terminal, wherein the second sidelink RRC message comprises the resource sensing result; and acquiring the resource sensing result from the second sidelink RRC message.

6. A method of configuring sidelink resource, comprising:

receiving, by a second sidelink terminal, resource sensing indication information transmitted by a first sidelink terminal;

obtaining, by the second sidelink terminal, a resource sensing result by performing resource sensing according to the resource sensing indication information; and returning, by the second sidelink terminal, the resource sensing result to the first sidelink terminal, so that the first sidelink terminal selects a sidelink resource for sidelink communication according to the resource sensing result;

wherein the resource sensing indication information comprises a specified sensing resource range; and performing resource sensing according to the resource sensing indication information, comprises:

performing resource sensing within the specified sensing resource range;

wherein the resource sensing indication information further comprises at least one of a specified first period representing a reporting period specified for the second sidelink terminal periodically reporting the resource sensing result to the first sidelink terminal, or a specified Quality of Service (QOS) indicator indicating a QoS basis specified for the second sidelink terminal performing resource sensing;

in response to the resource sensing indication information comprising the specified first period, returning the resource sensing result to the first sidelink terminal comprises: returning the resource sensing result to the first sidelink terminal at the first period, and in response to the resource sensing indication information comprising the QoS indicator, performing resource sensing according to the resource sensing indication information, comprises: performing resource sensing according to the specified QoS indicator.

7. The method according to claim 6, wherein the specified sensing resource range comprises a specified resource indicator for indicating at least one of following parameters:

at least one of a transmission resource pool or a receiving resource pool carried in a cell broadcast; or a specified resource pool configuration.

8. The method according to claim 6, wherein the resource sensing indication information comprises a specified cell indicator list comprising one or more cell indicators indicating one or more specified cells, wherein the second sidelink terminal performs resource sensing for the one or more specified cells; and performing resource sensing according to the resource sensing indication information comprises:

determining each of the one or more specified cells according to the specified cell indicator list;

in response to determining that a cell where the second sidelink terminal is currently located is one of the one or more specified cells, performing resource sensing; and in response to determining that the cell where the second sidelink terminal is currently located is not any of the one or more specified cells, performing no resource sensing until the second sidelink terminal moves to one of the one or more specified cells.

9. The method according to claim 6, wherein the first sidelink terminal and the second sidelink terminal are in unicast connection; and receiving the resource sensing indication information transmitted by the first sidelink terminal comprises:

receiving a first sidelink Radio Resource Control (RRC) message transmitted by the first sidelink terminal, wherein the first sidelink RRC message comprises the resource sensing indication information; and acquiring the resource sensing indication information from the first sidelink RRC message.

10. The method according to claim 6, wherein the first sidelink terminal and the second sidelink terminal are in unicast connection; and returning the resource sensing result to the first sidelink terminal comprises:

adding the resource sensing result to a second sidelink Radio Resource Control (RRC) message; and transmitting the second sidelink RRC message to the first sidelink terminal, so that the first sidelink terminal acquires the resource sensing result from the second sidelink RRC message.

11. An apparatus for configuring sidelink resource, comprising:

a processor; and a memory storing instructions executable by the processor, wherein the processor is configured to:

generate resource sensing indication information;

transmit the resource sensing indication information to a second sidelink terminal, wherein the resource sensing indication information instructs the second sidelink terminal to perform resource sensing according to the resource sensing indication information and return an obtained resource sensing result to the first sidelink terminal; wherein the resource sensing indication information comprises a specified sensing resource range;

receive the resource sensing result returned by the second sidelink terminal; and select a sidelink resource for sidelink communication according to the resource sensing result;

wherein the resource sensing indication information further comprises at least one of a specified first period representing a reporting period specified for the second sidelink terminal periodically reporting the resource sensing result to the first sidelink terminal, or a specified Quality of Service (QOS) indicator indicating a QoS basis specified for the second sidelink terminal performing resource sensing;

in response to the resource sensing indication information comprising the specified first period, the resource sensing result is returned by the second sidelink terminal at the first period; and in response to the resource sensing indication information comprising the specified QoS indicator, the resource sensing result is obtained by the second sidelink terminal performing resource sensing according to the specified QoS indicator.

* * * * *